Oct. 28, 1930.        M. KAHLE         1,780,018
ADJUSTABLE CLAMP
Filed Oct. 23, 1928
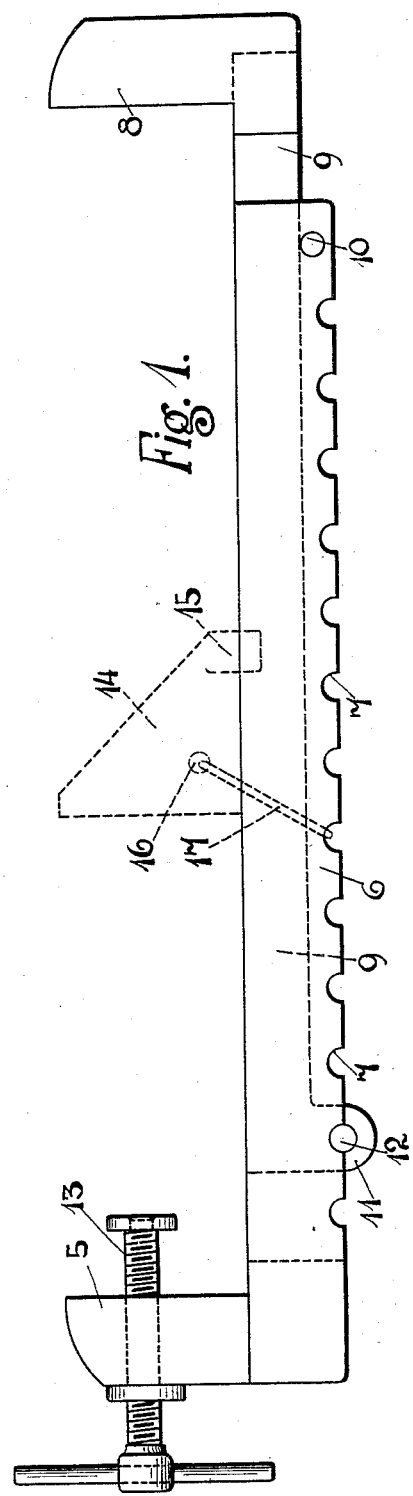
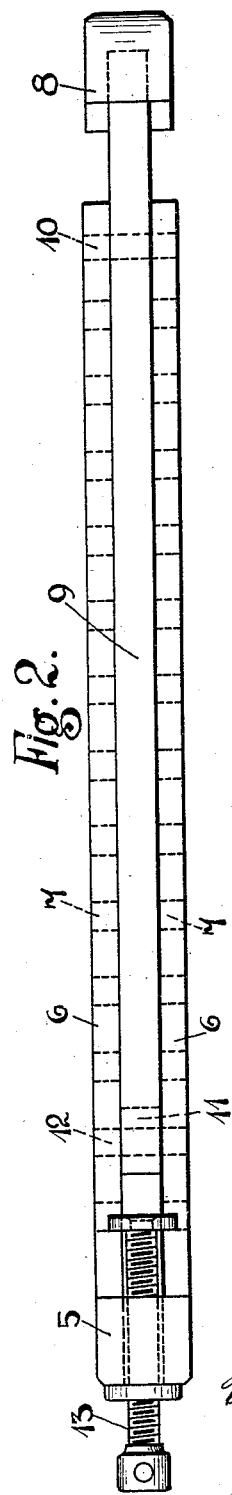
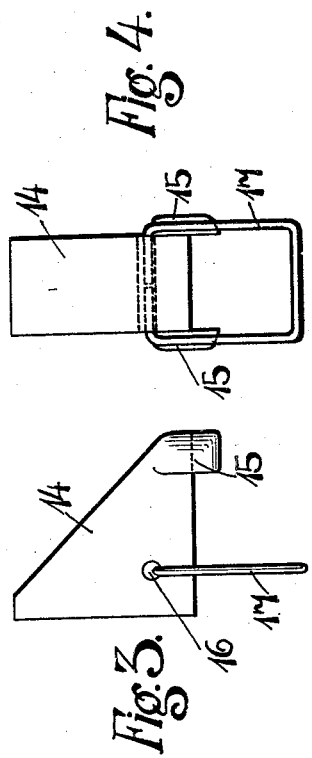
Max Kahle.
INVENTOR.
BY
ATTORNEY.

Patented Oct. 28, 1930

1,780,018

UNITED STATES PATENT OFFICE

MAX KAHLE, OF CHICAGO, ILLINOIS

ADJUSTABLE CLAMP

Application filed October 23, 1928. Serial No. 314,452.

The invention relates to clamps and more especially to clamps of the type described in the Patent No. 1,588,742 issued to me on June 15, 1928.

The object of the present invention is to provide a clamp adapted to be adjusted in reference to its length, the members of the clamp engaging the parts to be clamped together to be located exactly opposite each other, so that the parts engaged by said members will be kept securely in the desired position.

A further object of the invention is to provide a clamp of the indicated type having means for securing the movable parts of said clamp in any desired relative position, said means being arranged on another surface of the clamp than the top surface, so that the objects to be clamped together may be placed easily and readily on said top surface thereby facilitating the placing of said objects.

A still further object of the invention is to provide an intermediate clamping means adapted to be adjustably attached to said clamp between the members of the clamp usually employed for engaging the parts to be clamped together, so that with this means objects may be clamped together which are shorter than the distance between the clamping members, when the clamp is shortened as far as possible.

Another object of the invention is to provide a clamp of the class described wherein a common clamping screw removably extends through one of the clamping members, whereby an exact adjustment relative to length may be obtained.

Other objects of the invention not specifically mentioned will be easily ascertained and understood from the following description in connection with the accompanying drawings forming a part thereof. Said drawings illustrate a preferred embodiment of the invention. It is however noted, that the invention is not to be limited or restricted to the exact construction and formation shown in the drawings and described in the specification, but that said invention is only to be limited by the scope of the claims appended.

In the drawings:

Fig. 1 is an elevation of a clamp according to the invention.

Fig. 2 is a top view of Fig. 1.

Fig. 3 is a side view of an additional clamping means adapted to be used in connection with the invention, and Fig. 4 is an end view of Fig. 3.

The clamp according to the present invention consists of two main parts. The one may be called a male and the other a female part. The latter has a clamping portion 5 adapted to engage one end of the article to be held by said clamp and two guide bars 6 extending from the clamping portion and at right angles thereto.

Said bars are running parallel to each other and spaced from each other. On the lower surface of said bars a plurality of grooves or notches 7 extend crosswise thereof. Said notches may be arranged in regular spaced intervals of any desired length.

The male part also has a clamping portion 8 adapted to engage the other end of the article to be held by said clamp, and a glide bar 9 extending at right angles to the said clamping portion. The glide bar is of a thickness to fit slidingly between the bars 6.

The depth of said glide bar is somewhat less than the depth of the guide bar.

A pin 10 or the like extends through the two guide bars and is arranged adjacent the lower rim thereof and adjacent the free end of said bars, i. e. the end opposite the clamping portion of the female part.

The glide bar 9 has on its free end i. e. on the far end from the clamping portion of the male part a downwardly extending lug 11, and a pin 12 extends through said lug and beyond the same at both sides thereof. Said pin is of such shape and of such dimensions, that it fits snugly into the notches 7 of the guide bars 6. The length of the pin 12 is equal to the distance from the outer surface of one of the guide bars to the outer surface of the other one.

The clamp is assembled as follows:

The pin 10 is driven into holes provided for this purpose in the guide bars and the glide bar 9 is inserted between the guide bars so that it will rest on the pin 10 in the female part. The pin 12 is then driven through a hole provided in the lug 11 of the male part. When the said pin 12 in engagement with notch 7 and the glide bar rests on the pin 10 the upper surfaces of the guide bars and the glide bar are located on the same plane. The two parts are now movably connected with each other and the length of the clamp formed by said parts may easily be adjusted by swinging the lug end of the male part downwardly thereby disengaging the cross pin 12 of said male part from the cross notches 7 and then move the two parts relative to each until the clamp has the desired length, whereupon the male part is swung back into normal position, in which the cross pin 12 of said part will engage the corresponding cross notch 7. In addition to that a clamping rider 14 may be provided. This rider has substantially the shape of a triangle having a right angle adjacent its base.

On the end of the base opposite said right angle a couple of guide lugs 15 extend downwardly of said rider. Adjacent the right angle a hole 16 is provided in said rider and a shackle 17 is swingingly suspended in said hole.

Said rider may be put into position on the clamp between the two clamping portions 5 and 8 as indicated in dotted lines in Fig. 1. In this position the guiding lugs 15 are located one on each side of the female part and the shackle surrounds both parts of the clamp and may be brought into engagement with any desired cross notch of the female part, thereby holding said clamping rider in position to cooperate with the opposite clamping portion or with the clamping screw 13.

Having described my invention and how the same is to be performed I claim as new and desire to secure by Letters Patent:

1. In a device of the class described a clamping portion, a pair of parallel spaced apart guide bars extending at right angles thereof, a plurality of notches in the bottom surface of the said guide bars, a cross pin in the guide bars adjacent the free ends thereof and bridging the space between said bars, a second clamping portion, a glide bar on said second portion and extending at right angles thereof said glide bar adapted to fit slidingly between said guide bars, and to rest on said cross pin, a downward extension on the free end of said glide bar, and a pin extending through said extension and adapted to selectively engage any one of said notches in the guide, the upper surfaces of the guide bars and the glide bar being located in the same plane.

2. In a device of the class described a pair of guide bars, a clamping portion on one end of said bars and extending at right angles thereto, a glide bar adapted to be arranged slidingly between said guide bars, a second clamping portion on one end of said bars extending at right angles thereto, a cross pin bridging the distance between said guide bars adjacent the free ends thereof, a plurality of notches on the bottom surface of the guide bars, means on the guide bar for selectively engaging any one of said notches, the upper surfaces of the guide bars and the glide bar being located in the same plane, and as adjustable clamping screw extending through one of the clamping portions.

3. In a device of the class described a pair of parallel spaced guide bars, a clamping portion on one end of said bars and extending at right angles thereto, a pin bridging the distance between said bar adjacent the free end thereof, a glide bar adapted to be slidingly arranged between the guide bars and to rest on said cross pin, a plurality of notches in the bottom surface of the guide bars, a second clamping portion on said glide bar and extending at right angles thereto, means on said glide bar adjacent the free end thereof for selectively engaging one of said notches, the upper surfaces of the guide bars and the glide bar being located in the same plane, a clamping rider removably arranged on the top surface of the guide and glide bars, and means on said rider for selectively engaging one of said notches.

In witness whereof I affix my signature.

MAX KAHLE.